United States Patent [19]
Baettig et al.

[11] Patent Number: 6,068,687
[45] Date of Patent: May 30, 2000

[54] AZO DYES AND THEIR PREPARATION AND USE

[75] Inventors: Kurt Baettig, Praroman; Gérald Jan, Villars-sur-Glâne, both of Switzerland

[73] Assignee: Ilford Imaging Switzerland GmbH, Switzerland

[21] Appl. No.: 09/195,818

[22] Filed: Nov. 19, 1998

[30] Foreign Application Priority Data

Nov. 20, 1997 [EP] European Pat. Off. ............. 97810889

[51] Int. Cl.$^7$ .......................... C09D 11/02; C09B 29/09; C09B 31/02; C09B 31/16; B05D 1/26
[52] U.S. Cl. ...................... 106/31.48; 534/776; 534/796; 534/797; 534/803; 427/466; 8/688
[58] Field of Search ........................ 106/31.48; 534/776, 534/796, 797, 803; 427/466; 8/688

[56] References Cited

U.S. PATENT DOCUMENTS

| | | | |
|---|---|---|---|
| 3,122,531 | 2/1964 | Atkinson et al. | 534/776 |
| 3,163,635 | 12/1964 | Riat et al. | 534/776 |
| 3,264,109 | 8/1966 | Anderau et al. | 96/99 |
| 3,459,729 | 8/1969 | Crotti et al. | 534/776 |
| 4,626,284 | 12/1986 | Ohta et al. | 106/22 |
| 4,703,113 | 10/1987 | Baxter et al. | 534/796 |
| 4,771,129 | 9/1988 | Kawashita et al. | 534/803 |
| 4,780,532 | 10/1988 | Baxter et al. | 534/701 |
| 4,963,189 | 10/1990 | Hindagolla et al. | 106/22 |
| 4,968,784 | 11/1990 | Imai et al. | 534/797 |
| 4,975,118 | 12/1990 | Mayer et al. | 106/22 |
| 4,997,919 | 3/1991 | Schaulin | 534/637 |
| 5,118,737 | 6/1992 | Baxter et al. | 524/100 |
| 5,466,282 | 11/1995 | Eida et al. | 106/31.48 |
| 5,721,344 | 2/1998 | Baettig | 534/776 |
| 5,772,745 | 6/1998 | Gregory et al. | 106/31.48 |
| 5,844,100 | 12/1998 | Baettig | 534/776 |

FOREIGN PATENT DOCUMENTS

| | | | |
|---|---|---|---|
| 0187520A2 | 7/1986 | European Pat. Off. | C09B 43/16 |
| 0194885A1 | 9/1986 | European Pat. Off. | C09B 43/16 |
| 0425150A2 | 5/1991 | European Pat. Off. | C09D 11/00 |
| 0597672A2 | 5/1994 | European Pat. Off. | C09D 11/00 |
| 0755984A | 1/1997 | European Pat. Off. | C09B 43/16 |
| 05171053 | 7/1993 | Japan | C09B 62/513 |
| 2289473 | 11/1995 | United Kingdom | C09B 31/08 |
| WO 96/24635 | 8/1996 | WIPO | C09B 43/16 |
| WO 96/24636 | 8/1996 | WIPO | C09B 43/16 |
| WO 98/12263 | 3/1998 | WIPO | C09B 43/16 |
| WO 98/12264 | 3/1998 | WIPO | C09B 43/16 |

OTHER PUBLICATIONS

Analytical Report, Photographic Gelatin ST 71, 810 Deutsche Gelatinefabrikin (DGF Stoess), Jun. 1995.

Olin Chemical Specialities Specifications–Glycidol Surfactant 10G, Mar. 1989.

Ciba–Geigy Speciality Chemicals Data Sheet For Compound 11 in application, Nov. 1995.

*Primary Examiner*—Helene Klemanski
*Attorney, Agent, or Firm*—Ostrager Chong Flaherty & Onofrio

[57] ABSTRACT

Azo dyes of formula (4)

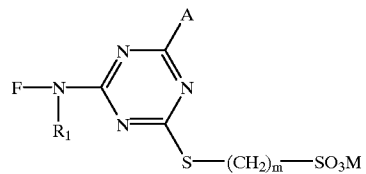

(4)

wherein A, $R_4$, M and m are as defined in the specification, are excellent dyes for dyeing and printing of cellulose containing materials and especially for the preparation of inks for ink jet printing.

18 Claims, No Drawings

AZO DYES AND THEIR PREPARATION AND USE

FIELD OF THE INVENTION

This invention relates to novel azo dyes and their salts, a method of their preparation and their use in dying and printing operations. It relates also to liquid dye preparations containing these dyes, particularly to aqueous inks for ink jet printing.

BACKGROUND OF THE INVENTION

Ink jet printing processes are of two types, continuous stream and drop-on-demand.

In continuous stream ink jet printing systems, ink is emitted in a continuous stream under pressure through a nozzle. The stream is perturbed, causing it to break up into droplets at a fixed distance from the nozzle. At the break-up point, the drop-lets are charged in accordance with digital data signals and passed through an electric static field which adjusts the trajectory of each droplet in order to direct it to a gutter for recirculation or to a specific location on a recording medium.

In the non-continuous process, or the so called "drop-on-demand" systems, a droplet is expelled from a nozzle to a position on a recording medium in accordance with digital data signals. A droplet is not formed and expelled unless it is to be placed on the recording medium.

The most important part of an ink for ink jet printing are the dyes. Although a number of dyes have been proposed none meets all the requirements of a modern printing process.

Reactive dyes with incorporated 1,3,5-triazine structural elements are common in textile printing. They have also been proposed as dyes for ink jet printing. For several reasons these dyes are not very suitable for this application. The reactive groups are not very stable over prolonged periods in aqueous solutions. Furthermore, dyes containing such reactive groups are due to their potential health risk, less suitable for handling in a non-chemical environment, where ink jet printing is normally done.

Dyes of different structures not containing reactive groups have been described for example in the patents U.S. Pat. No. 4,771,129, U.S. Pat. No. 4,780,532, U.S. Pat. No. 4,968,784, U.S. Pat. No. 4,975,118, U.S. Pat. No. 4,997,919 and U.S. Pat. No. 5,118,737 as well as in the patent applications JP 5-171,053, EP 0,187,520, EP 0,194,885 and EP 0,755,984 as being suitable dyes for inks for ink jet printing.

The azo dye of formula (1)

(1)

has been described in patent application EP 0,187,520 (example 4). This dye and similar dyes described therein, however, are not soluble enough for their intended use in inks for modern ink jet printers.

The azo dye of formula (2)

(2)

has been described in patent application EP 0,755,984 (dye 100). The very high water solubility of the azo dye of formula (2) and of similar dyes has been attributed to the introduction of the structural element (3)

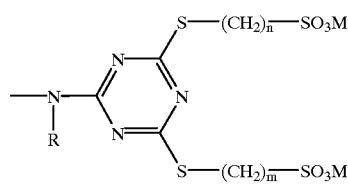

(3)

wherein R represents hydrogen or alkyl with 1 to 6 C atoms; M represents hydrogen, a metal cation or a substituted ammonium cation wherein the substituent is selected from the group consisting of alkyl, alkoxyalkyl or hydroxyalkyl each having from 1 to 12 C atoms; and n and m independently of each other have a value from 2 to 6.

Dyes having the structural element (3) mentioned above however show the disadvantage that they are not very stable against hydrolysis and that therefore inks containing such dyes are not stable when stored over long periods of time. They therefore do not satisfy all the required demands when used in recording liquids for ink jet printing.

Dyes used for such recording liquids have to show a good solubility in the essentially aqueous ink liquid, they have to penetrate into the recording medium and should not show dye aggregation on the surface of the recording medium ("bronzing"). They need to provide printed images having high optical density, good water fastness and excellent light fastness. They need to be stable in the ink even when the recording liquid is stored for a long time under adverse conditions. Various types of compositions have been proposed as inks for ink jet printing. Typical inks comprise one or more dyes, water, organic cosolvents and other additives.

The inks have to meet the following criteria:
(1) The ink gives high quality images on any type of recording medium.
(2) The ink gives printed images exhibiting excellent water fastness.
(3) The ink gives printed images exhibiting excellent light fastness.
(4) The ink gives printed images exhibiting excellent smudge behavior.
(5) The ink does not clog jetting nozzles even when these are kept uncapped while recording is suspended.
(6) The ink can be stored for long periods of time without deterioration of its quality.
(7) The values of the physical properties of the inks as viscosity, conductivity and surface tension are all within defined ranges.
(8) The ink has to be non toxic, not flammable and safe.

DESCRIPTION OF THE INVENTION

This invention relates to novel azo dyes showing high solubility and excellent stability against hydrolysis in aqueous recording liquids especially for ink jet printing. Printed images containing these dyes according to the invention show high optical density, excellent water fastness, excellent light fastness and excellent smudge behavior.

Another object of the present invention is the provision of recording liquids especially for ink jet printing, showing high quality images on any type of recording medium as plain or coated paper, coated or uncoated, opaque or transparent synthetic materials.

A further object of the present invention is to provide recording liquids satisfying also all the other requirements mentioned above.

The present invention relates to novel azo dyes of general formula (4) showing very high solubility and at the same time excellent stability against hydrolysis,

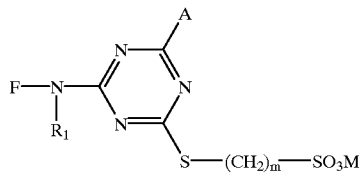

(4)

wherein

A represents $NR_3R_4$, wherein $R_3$ and $R_4$ independently represent hydrogen; alkyl with 1 to 6 C atoms; substituted alkyl with 2 to 6 C atoms, where the substituents are selected from the group consisting of OH, $OCH_3$ and COOM; aralkyl; aryl or substituted aryl, where the substituents are selected from the group consisting of COOM, Cl, Br or $SO_3M$; or where $R_3$ and $R_4$ together form a ring with or without a hetero atom;

or represents $OR_2$ wherein $R_2$ represents hydrogen or alkyl with 1 to 8 C atoms;

m is from 2 to 6;

$R_1$ represents hydrogen or alkyl with 1 to 6 C atoms;

M represents hydrogen, a metal cation, ammonium or substituted ammonium, wherein the substituents are selected from the group consisting of alkyl, alkoxyalkyl or hydroxyalkyl each having from 1 to 12 C atoms or phenyl; guanidinium or substituted guanidinium, where the substituent is selected from the group consisting of alkyl with 1 to 12 C atoms or phenyl;

and

F represents a monoazo or a polyazo dye radical.

The compounds of general formula (4) may be in the free acid form or in the form of inorganic or organic salts thereof. Preferably they are in the form of salts with cations such as alkali metal or ammonium or guanidinium, wherein the ammonium or guanidinium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methyl-ammonium, tris-[2-(2-methoxyethoxy)-ethyl]-ammonium, 8-hydroxy-3,6-dioxaoctylammonium and tetraalkylammonium as for example tetramethylammonium or tetrabutylammonium. Diphenylguanidinium is an example of a substituted guanidinium cation.

The invention does not only cover pure dyes of formula (4), but also mixtures of these compounds.

Especially preferred are dyes wherein the dye radical F has the following structural formulas:

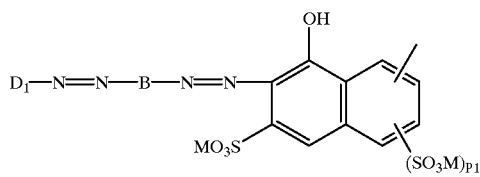

wherein

M is as defined above;

B represents one of the following groups

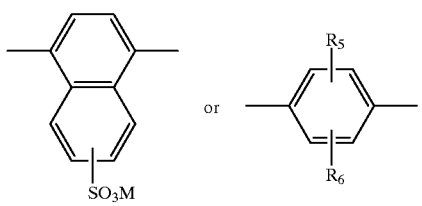 or wherein
R$_5$, R$_6$ independently represent hydrogen, alkyl or alkoxy each having from 1 to 4 C atoms, chloro, bromo, carboxy or sulpho;
D$_1$ represents phenyl or phenyl substituted by one or two substituents selected from the group consisting of alkyl, alkoxy, chloro, bromo, carboxy and sulpho, or naphthyl or naphthyl substituted by 1 or 2 sulpho groups;
and
p$_1$ is 0 or 1;
or

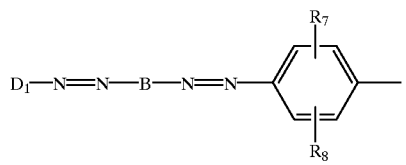

wherein
D$_1$ and B are as defined above;
and
R$_7$, R$_8$ independently represent hydrogen, alkyl or alkoxy or acylamino with up to 3 C atoms;
or

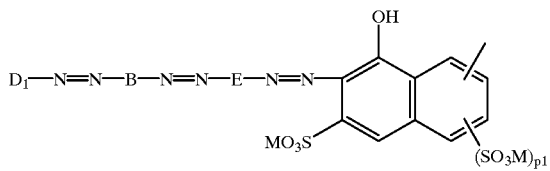

wherein
M, D$_1$, B and p$_1$ are as defined above;
and
E represents phenyl or phenyl substituted by one or two substituents selected from the group consisting of alkyl, alkoxy, chloro, bromo, carboxy and sulpho, or naphthyl or naphthyl substituted by one or two substituents selected from the group consisting of sulpho, hydroxy and amino;
or

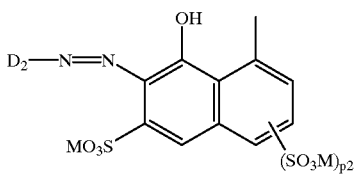

wherein
M is as defined above;
D$_2$ represents phenyl or phenyl substituted by one or two substituents selected from the group consisting of alkyl, alkoxy, chloro, bromo, carboxy and sulpho, or naphthyl or naphthyl substituted by one or two sulpho groups;
and
p$_2$ is 0 or 1;
or

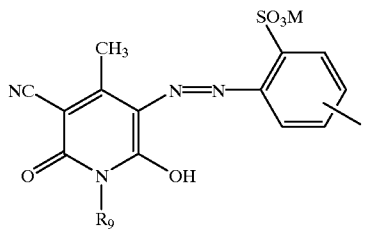

wherein
M is as defined above;
and
R$_9$ represents hydrogen, alkyl with 1 to 6 C atoms, substituted alkyl with 2 to 6 C atoms, where the substituents are selected from the group consisting of carboxy, hydroxy and sulpho, phenyl or substituted phenyl, where the substituents are selected from the group consisting of methyl, chloro, bromo and sulpho;
or

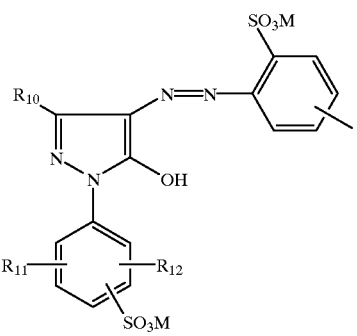

wherein
M is as defined above;
R$_{10}$ represents CH$_3$, COOH or NHCOCH$_3$;
and
R$_{11}$, R$_{12}$ independently represent hydrogen, chloro, bromo or methyl;
or

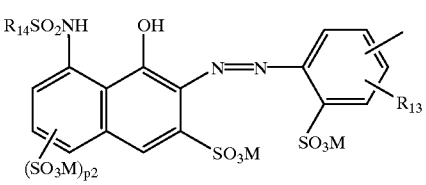

wherein
M is as defined above;
R$_{13}$ represents hydrogen, alkyl or alkoxy each having up to 3 C atoms;
R$_{14}$ represents alkyl with 1 to 8 C atoms, phenyl or phenyl substituted by one or more substituents selected from the group consisting of chloro, bromo, alkyl and alkoxy each having from 1 to 4 C atoms;

and p₂ is 0 or 1;

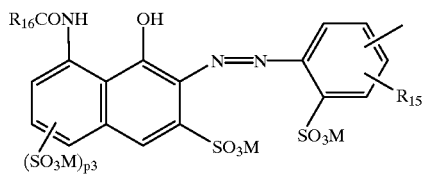

wherein

M is as defined above;

R₁₅ represents hydrogen, alkyl or alkoxy each having up to 3 C atoms;

R₁₆ represents alkyl with 1 to 8 C atoms, substituted alkyl with 1 to 6 C atoms, where the substituents are selected from the group consisting of COOCH₃, COOH and halogen, phenyl or phenyl substituted by one or more substituents selected from the group consisting of chloro, bromo, alkyl, alkoxy, alkylcarbonylamino and alkylsulphonyl each having from 1 to 4 C atoms, or pyridine;

and p₃ is 0 or 1;

or

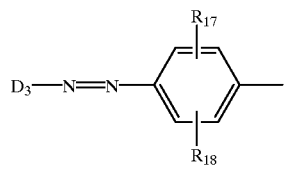

wherein

D₃ represents phenyl or phenyl substituted by one or two substituents selected from the group consisting of sulpho, chloro, bromo, carboxy, alkyl and alkoxy;

and

R₁₇, R₁₈ independently represent hydrogen, chloro, bromo, ureido, alkyl, alkoxy or acylamino each having up to 3 C atoms;

or

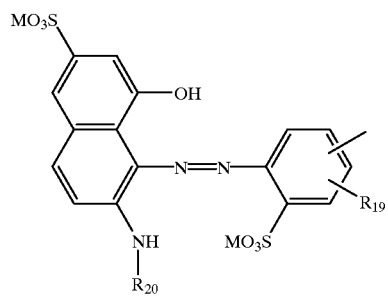

wherein

M is as defined above;

R₁₉ represents hydrogen, alkyl or alkoxy with up to 3 C atoms;

and

R₂₀ represents hydrogen, alkyl with 1 to 6 C atoms, substituted alkyl with 2 to 6 C atoms, where the substituents are selected from the group consisting of CN, COOH, OH, COOCH₃, COOCH₂CH₃ and COCH₃, phenyl or substituted phenyl, where the substituents are selected from the group consisting of methyl, chloro and bromo;

or

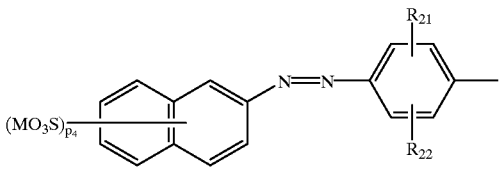

wherein

M is as defined above;

R₂₁, R₂₂ independently represent hydrogen, chloro, bromo, ureido, alkyl, alkoxy or acylamino each having up to 3 C atoms;

and p₄ is 1, 2 or 3 and the SO₃M group is in positions 1 or 4 or 5 or 6 or 7 or 8, when p₄ is 1; or the SO₃M groups are in positions 4 and 8 or 5 and 7 or 6 and 8 or 1 and 5, when p₄ is 2; or the SO₃M groups are in positions 3 and 6 and 8 or 4 and 6 and 8, when p₄ is 3.

The following dyes are examples of dyes of formula (4) where F is a monoazo radical:

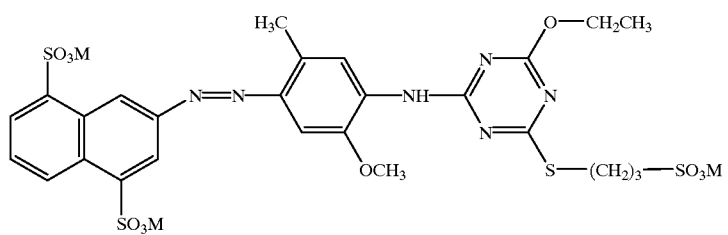
(100)
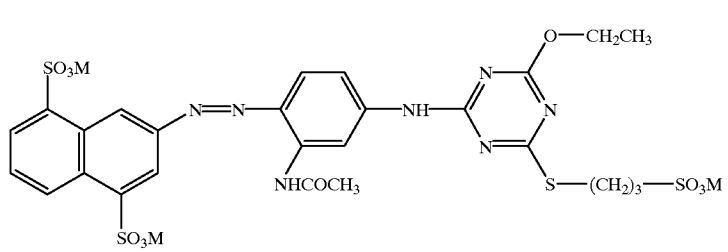
(101)
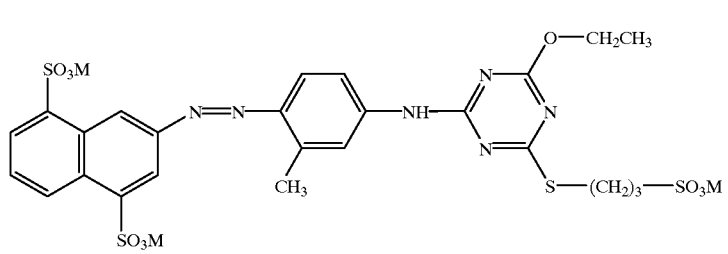
(102)
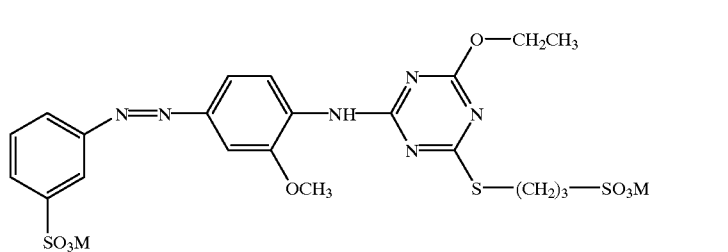
(103)
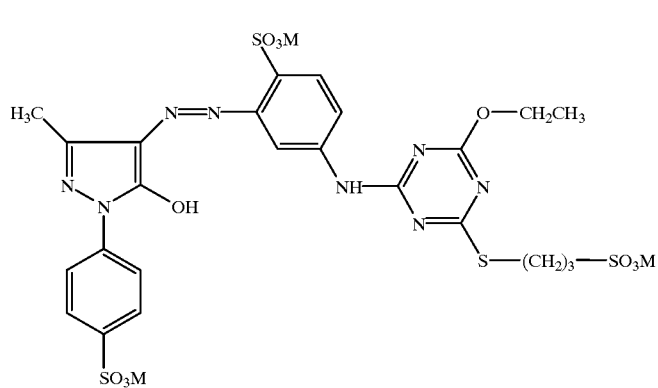
(104)

-continued
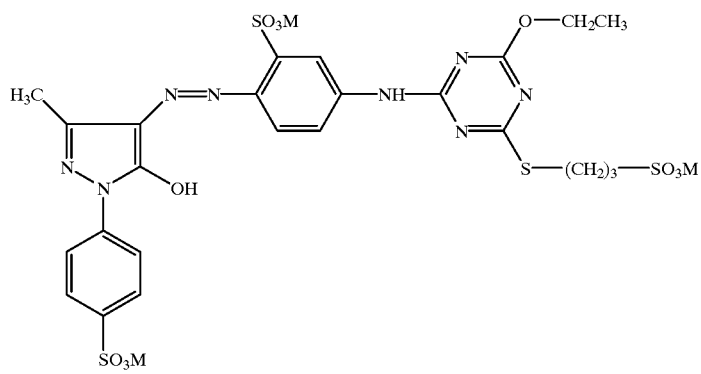
(105)
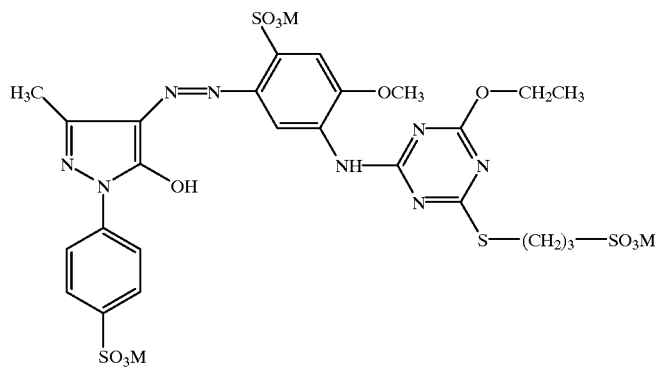
(106)
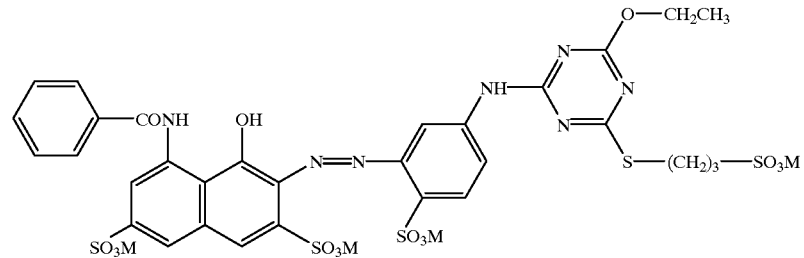
(107)
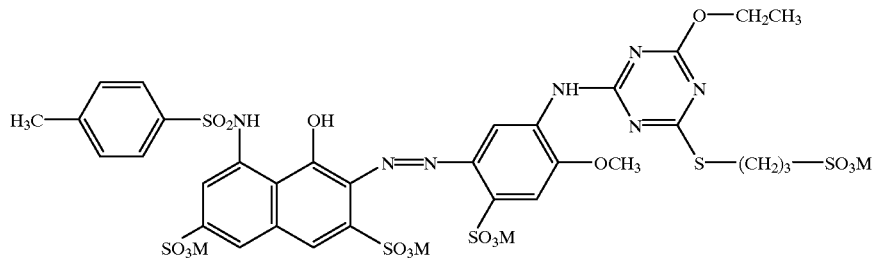
(108)
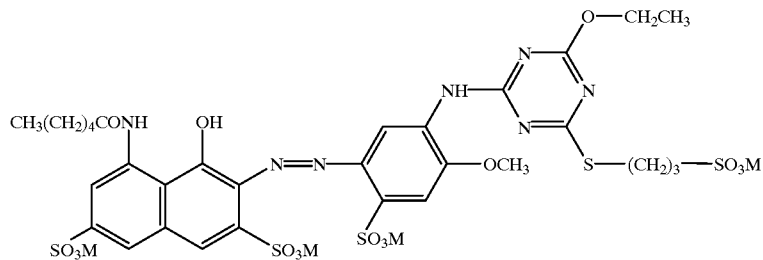
(109)

-continued
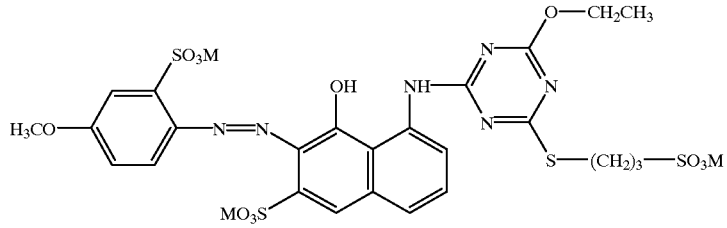
(110)
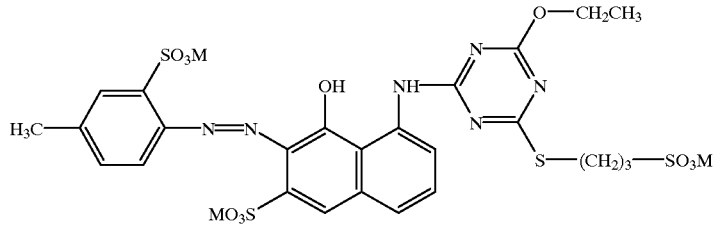
(111)
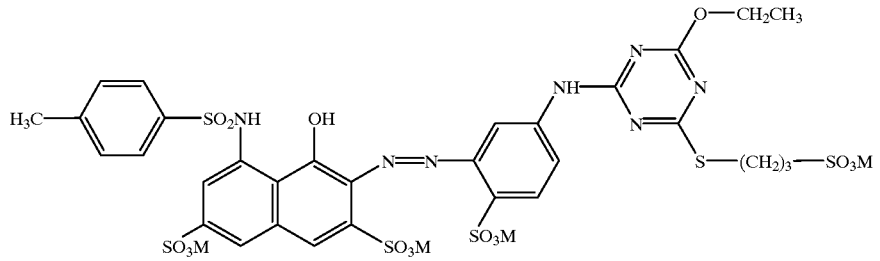
(112)
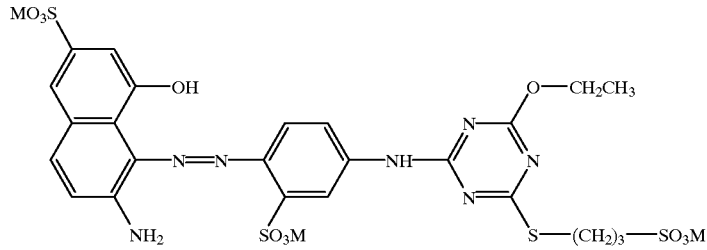
(113)
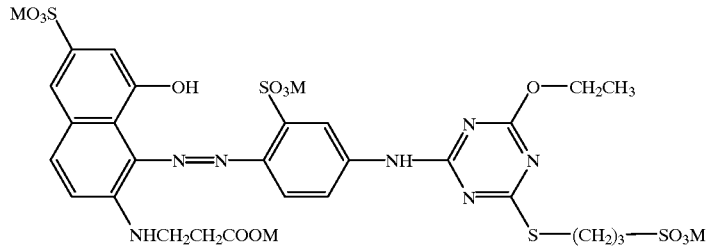
(114)
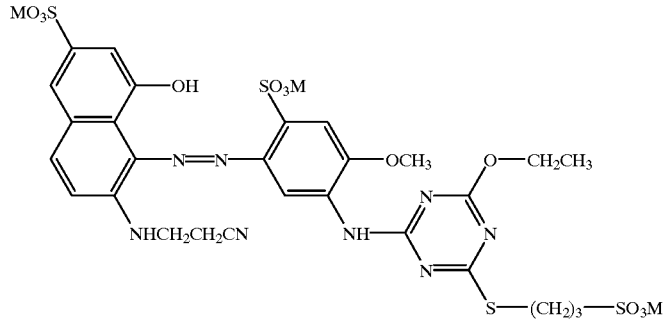
(115)

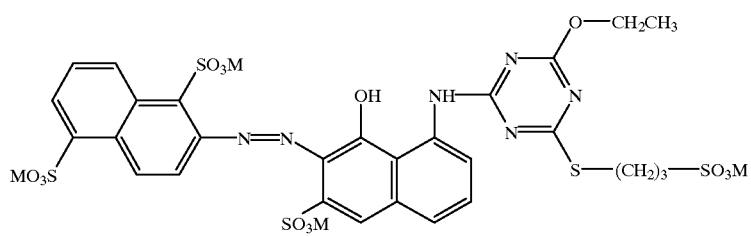
(116)
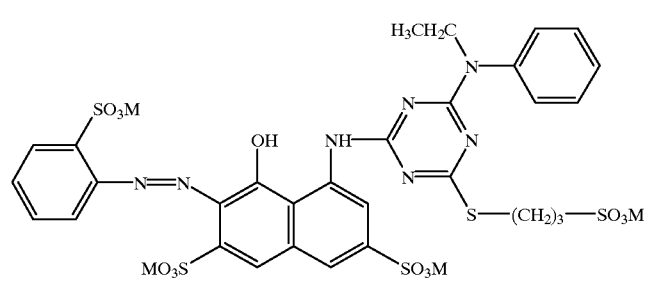
(117)
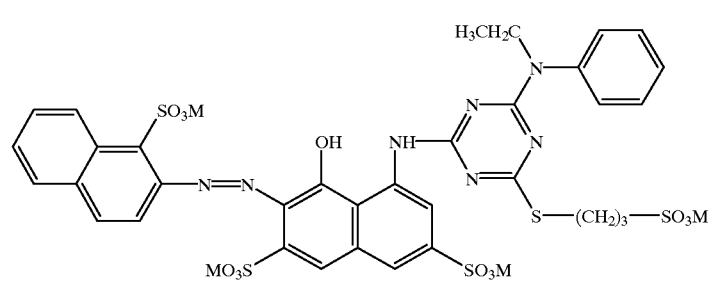
(118)
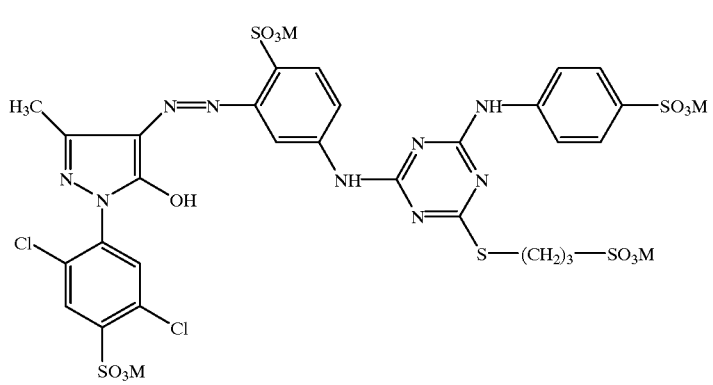
(119)
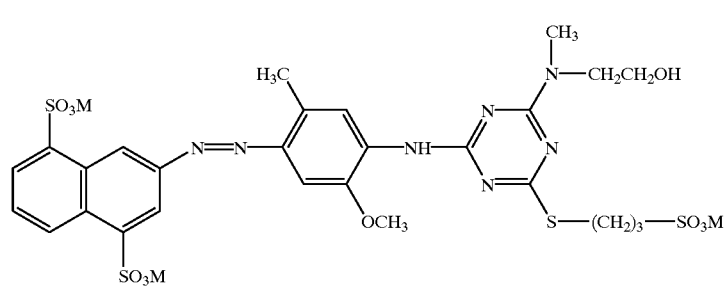
(120)

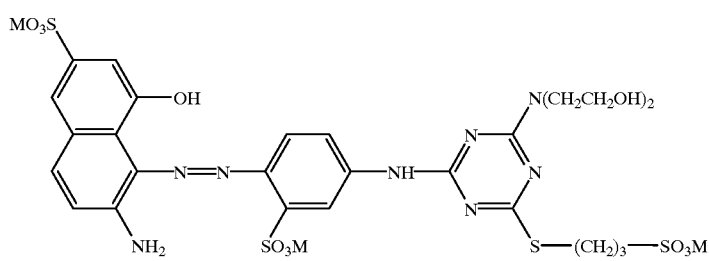
(121)
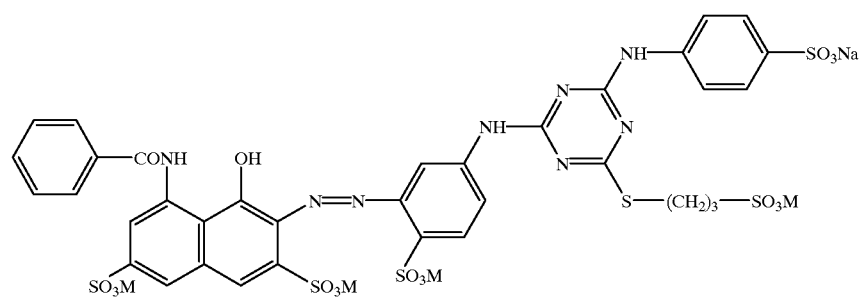
(122)
The following dyes are examples of dyes of formula (4) where F is a polyazo radical:
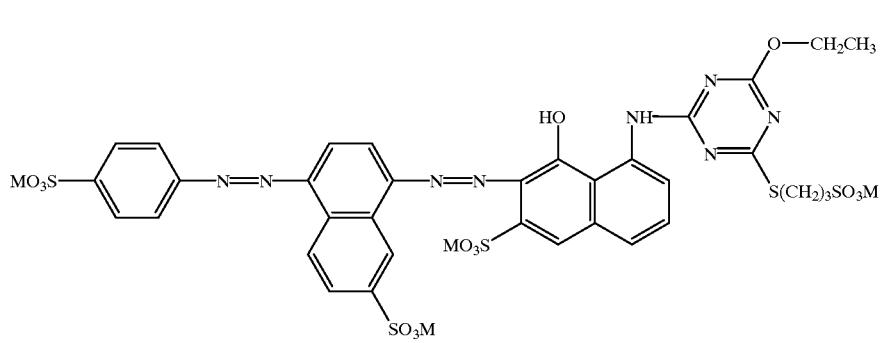
(123)
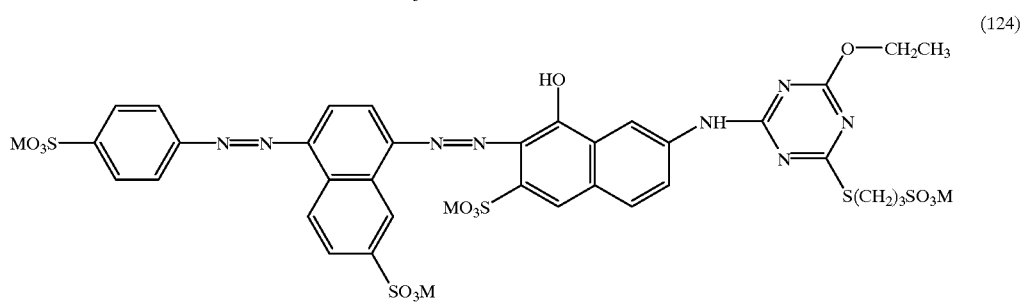
(124)
The invention further claims a process for the preparation of the azo dyes of formula (4) characterized in that (i) a compound of formula (5)

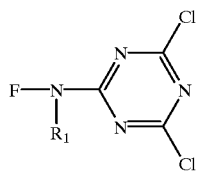

wherein $R_1$ and F are as defined above, is reacted with a compound of formula (6)

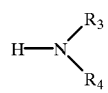

wherein $R_3$ and $R_4$ are as defined above, under conditions that one of the chlorine atoms of the dichlorotriazine of formula (5) is replaced by the compound of formula (6);

or a compound of formula (7)

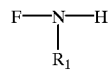

wherein $R_1$ and F are as defined above, is reacted with a compound of formula (8)

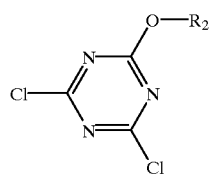

wherein $R_2$ is as defined above, under conditions that one of the chlorine atoms of the dichlorotriazine of formula (8) is replaced by the compound of formula (7);

and (ii) the disubstituted triazine is reacted with a compound of formula (9)

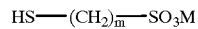

wherein m is as defined above, under conditions that the third chlorine atom of the triazine ring is replaced by the compound of formula (9).

The dyes of formula (4) according to the invention are used to dye cellulose containing materials, paper, cotton and viscose as well as leather and wool to provide dyed material with good water and light fastness.

Methods well known in the textile and paper industries for dyeing with substantive dyes may be used with the dyes according to our invention, preferably for the bulk or surface treatment of sized or unsized paper. The dyes may also be used in the dyeing of yarns and piece goods of cotton, viscose and linen by the exhaustion process from a long liquor or in continuous processes.

The invention furthermore relates to liquid dye preparations comprising at least one dye of general formula (4). The use of such liquid dye preparations is preferred for paper dyeing. Such stable, liquid, preferably aqueous, and concentrated dye preparations may be obtained by using methods well known in the art, preferably by dissolving in suitable solvents. The possibility of preparation of such stable aqueous concentrated preparations in the course of dye synthesis itself, without intermediate isolation of the dye, is of particular advantage.

Dyes or mixtures of dyes of formula (4) are excellent dyes for the preparation of recording liquids for ink jet printing.

A suitable ink comprises one or more compounds according to the invention in a liquid aqueous medium. The ink contains from 0.5 to 20% by weight, preferably from 0.5 to 5% by weight, of this or these compounds, based on the total weight of the ink. The liquid medium is preferably water or a mixture comprising water and water soluble or water miscible organic solvents. Suitable solvents are given for example in U.S. Pat. Nos. 4,626,284, 4,703,113, 4,963,189 and in Patent Applications GB 2,289,473, EP 0,425,150 and EP 0,597,672.

The present invention will be illustrated in more detail by the following examples without limiting the scope of the claimed compounds in any way.

EXAMPLES

Example 1

The sodium salt of dye (100) was prepared in the following way: 62.4 g (0.126 moles) of the monoazo compound of formula (10),

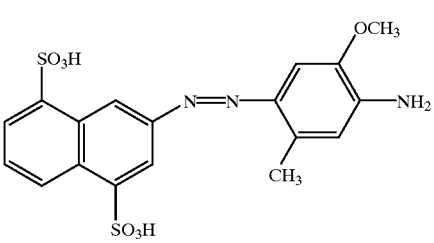

prepared as described in patent U.S. Pat. No. 3,264,109, were added to 250 ml of water and the pH value was adjusted to 6.5 by the addition of sodium hydroxide (30%). 11.7 g (0.139 moles) of sodium hydrogencarbonate were added and a solution of 26.8 g (0.138 moles) of 2,4-dichloro-6-ethoxy-1,3,5-triazine in 60 ml of ethyl acetate was added dropwise. The reaction mixture was stirred for 1 hour at a temperature from 20° C. to 25° C. Afterwards 14.7 g (0.139 moles) of sodium carbonate and 24.8 g (0.139 moles) of the sodium salt of 3-mercapto-1-propanesulfonic acid in 50 ml of water were added and the reaction mixture was stirred for 2 hours at a temperature of 70° C. 0.7 ml of acetic acid were added to give a pH value of 6.0. After the addition of 900 ml of ethanol the formed precipitate was filtered off, washed with 150 ml of ethanol and dried in vacuum at a temperature of 60° C. to yield 110 g of the yellow dye of formula (100).

Dyes (101) to (116) may be prepared in a similar way by using appropriate starting materials.

Dyes according to the invention prepared in this way are listed in Table 1 together with the position of their absorption maximum.

TABLE 1

| Dye | M | $\lambda_{max}$ (nm) in $H_2O$ |
|---|---|---|
| (100) | Na | 402 |
| (101) | Na | 393 |
| (102) | Na | 382 |
| (103) | Na | 378 |
| (104) | Na | 391 |
| (105) | Na | 420 |
| (106) | K | 432 |
| (107) | Na | 534 |
| (108) | Na | 531 |
| (109) | Na | 532 |
| (110) | Na | 529 |
| (111) | Na | 519 |
| (112) | Na | 527 |
| (113) | Na | 514 |
| (114) | Na | 535 |
| (115) | Na | 542 |
| (116) | Na | 519 |

Example 2

The sodium salt of dye (117) was prepared in the following way: 48.6 g (0.02 moles) of an aqueous solution (ca 33%) of the monoazo compound of formula (11),

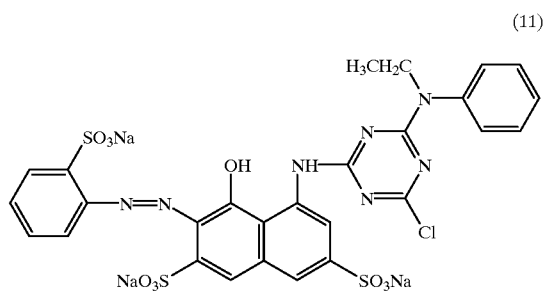

(11)

available from Ciba Specialty Chemicals, Basel, Switzerland, were added to 50 ml of water. 5.4 g (0.03 moles) of the sodium salt of 3-mercapto-1-propanesulfonic acid in 20 ml of water were added to this mixture and the reaction mixture was stirred for 2 hours at a temperature of 70° C. 0.7 ml of acetic acid were added after cooling down to room temperature to give a pH value of 6.0. After the addition of 900 ml of ethanol the formed precipitate was filtered off, washed with 150 ml of ethanol and dried in vacuum at a temperature of 60° C. to yield 8.7 g of the magenta dye of formula (117).

Dyes (118) to (122) may be prepared in a similar way by using appropriate starting materials.

Dyes according to the invention prepared in this way are listed in Table 2 together with the position of their absorption maximum.

TABLE 2

| Dye | M | $\lambda_{max}$ (nm) in $H_2O$ |
|---|---|---|
| (117) | Na | 535 |
| (118) | Na | 547 |
| (119) | Na | 404 |
| (120) | Na | 408 |
| (121) | K | 517 |
| (122) | Na | 517 |

Preparation of Ink Examples

The present invention, as far as it relates to inks, is further illustrated by the following examples using dyes according to our invention and dyes representing the state of the art.

100 g of each ink were prepared by heating the necessary components from Table 3 (all amounts are indicated in grams) together with water at a temperature of 50° C. under stirring for one hour. The resulting solution was cooled down to 20° C., its pH value was adjusted to 7.5 and the solution was passed through a Millipore® filter of 0.5 μm pore diameter.

The inks of examples 5 to 10 of Table 3 contain dyes according to our invention, whereas examples C-11 and C-12 contain dyes of the state of the art.

TABLE 3

| | Example | | | | | | | |
|---|---|---|---|---|---|---|---|---|
| Component | 5 | 6 | 7 | 8 | 9 | 10 | C-11 | C-12 |
| Dye | (100) | (104) | (113) | (117) | (120) | (122) | (1) | (2) |
| (Dye quantity) | 4 | 4 | 4 | 4 | 4 | 4 | 4 | 4 |
| Diethylene glycol | | | 10 | | 5 | | | |
| Ethylene glycole | 5 | 20 | 10 | | | | 5 | 5 |
| 1, 3-Butanediole | | | | 5 | 5 | | | |
| Glycerol | 15 | | | 15 | 10 | 20 | 15 | 15 |
| Sodium formiate | 1 | | 1 | | 1 | | 1 | 1 |
| Lithium chloride | | 0.5 | | 0.5 | | | | |
| Ammonium sulfate | | | | | | 0.5 | | |
| Methyl-4-hydroxy-benzoate | 0.1 | 0.1 | 0.1 | 0.1 | 0.1 | 0.1 | 0.1 | 0.1 |

Testing of Ink Examples

A recording medium for testing purposes was prepared in the following way: 30 g of gelatin with a high isoelectric point (type St 70,810, available from Deutsche Gelatinefabriken, Eberbach, Germany) were dissolved in 360 ml of deionised water. 1 g of a surfactant (Olin 10G, available from Olin Corporation, Norwalk, USA) were added to this solution. Immediately before coating 6.6 g of a solution of 2-(4-dimethyl-carbamoyl-pyridino)-ethanesulfonate (3%) were added and the pH value was adjusted to 6.5. 100 g/m² of this solution was then coated onto a resin coated paper support using a bar coater. The recording medium prepared in this way was dried for 12 hours.

The inks were then jetted onto this recording medium with a type 3024 IRIS ink jet printer to check their properties during printing as well as the quality of the printed images.

EVALUATIONS

The evaluation methods for (A) Dye solubility, (B) Hydrolysis stability, (C) Storage stability, (D) Jetting stability, (E) Image quality, (F) Smudge resistance, (G) Water fastness and (H) light fastness are as follows:

(A) Dye Solubility

An excess of dye was dispersed in deionised water and this dispersion was stirred for 1 hour at 50° C. Then the mixture was cooled down to 20° C., centrifuged and filtered through a Millipore® filter of 0.5 μm pore diameter. Dye solubility was determined spectroscopically in the filtered solution.

(B) Hydrolysis Stability

An aqueous solution (5% by weight) was prepared and the pH value of this solution was adjusted to 7.0. The solution was filtered through a Millipore® filter of 0.5 μm pore diameter. The filtered solution was then heated to a temperature of 60° C. for 30 days, cooled down afterwards to a temperature of 20° C. and the pH value was measured again. The difference of the pH values before and after storage is an indicator of hydrolysis stability.

(C) Storage Stability

The inks were stored at a temperature of 0° C. for 30 days in hermetically sealed bottles. The quantity of precipitate eventually formed was evaluated in the following way:
⊕: No precipitation
◊: Slight precipitation
Ø: Heavy precipitation (D) Jetting Stability The inks were expelled continually during 100 hours from a nozzle of the IRIS ink jet printer. Afterwards the change of the exit angle of the ink stream and the condition of the nozzle were evaluated in the following way:
⊕: Unchanged
◊: Slightly changed
Ø: Heavily changed (E) Image Quality The printed images were evaluated in respect of sharpness and optical density in the following way:
⊕: No blurring and high density
◊: Slight blurring and high density
Ø: Severe blurring and low density (F) Smudge resistance The smudge behavior of printed samples was determined by rubbing a dye patch of high density with a slightly wet finger. The smudge resistance is indicated in the following way:
⊕: No or little smear
◊: Slight smear
Ø: Severe smear (G) Water fastness The printed samples were soaked for 1 minute at room temperature in deionised water. Afterwards bleeding was evaluated in the following way:
⊕: No bleeding
◊: Slight bleeding
Ø: Severe bleeding (G) Light fastness The printed samples were irradiated in an ATLAS Ci35A Weather-O-Meter® with a 6500 W Xenon lamp until a total illumination of 40 kJoule/cm² was reached. The density loss was measured with an X-Rite® densitometer and evaluated in the following way:
⊕: Less than 10% density loss
Ø: More than 10% density loss Dye solubilities and hydrolysis stabilities determined as described above are listed in Table 4.

TABLE 4

| Dye | Solubility (in g per 100 ml) | pH change during storage |
|---|---|---|
| (100) | 32 | 0 |
| (113) | 32 | −0.1 |
| (120) | 34 | 0 |
| (121) | 38 | −0.1 |
| (1) | 12 | −0.2 |
| (2) | 34 | −0.5 |

The dyes according to our invention (100), (113), (120) and (121) show a considerably higher solubility than the previously known dye (2) and a much better stability against hydrolysis than the known dye (2). The solubilities of the dyes according to our invention are similar to those of dye (2) in spite of having one sulpho group less.

Results of the tests (C) to (H) are listed in Table 5.

TABLE 5

| Example with dye | Tested property | | | | | |
|---|---|---|---|---|---|---|
| | (C) | (D) | (E) | (F) | (G) | (H) |
| (100) | ⊕ | ⊕ | ⊕ | ⊕ | ⊕ | ⊕ |
| (113) | ⊕ | ⊕ | ⊕ | ⊕ | ⊕ | ⊕ |
| (117) | ⊕ | ⊕ | ⊕ | ⊕ | ⊕ | Ø |
| (120) | ⊕ | ⊕ | ⊕ | ⊕ | ⊕ | ⊕ |
| (121) | ⊕ | ⊕ | ⊕ | ⊕ | ⊕ | ⊕ |
| (1) | ◊ | ◊ | ⊕ | ◊ | ◊ | ⊕ |
| (2) | ⊕ | ⊕ | ⊕ | ⊕ | ◊ | ⊕ |

As can easily be seen from the results in Table 5 all the other tested properties of the dyes according to our invention are similar to those of the dyes being state of the art.

What is claimed is:

1. Azo dyes of formula (4)

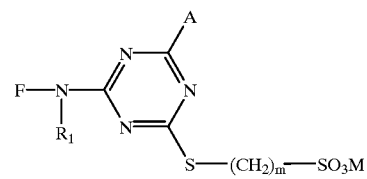

(4)

wherein

A represents NR₃R₄, wherein R₃ and R₄ independently represent hydrogen; alkyl with 1 to 6 C atoms; substituted alkyl with 2 to 6 C atoms, where the substituents are selected from the group consisting of OH, OCH₃ and COOM; aralkyl; aryl or substituted aryl, where the substituents are selected from the group consisting of COOM, Cl, Br or SO₃M; or where R₃ and R₄ together form a ring with or without a hetero atom;

or represents OR₂ wherein R₂ represents hydrogen or alkyl with 1 to 8 C atoms;

m is from 2 to 6;

$R_1$ represents hydrogen or alkyl with 1 to 6 C atoms;

M represents hydrogen, a metal cation, ammonium or substituted ammonium, wherein the substituents are selected from the group consisting of alkyl, alkoxyalkyl or hydroxyalkyl each having from 1 to 12 C atoms or phenyl; guanidinium or substituted guanidinium, where the substituent is selected from the group consisting of alkyl with 1 to 12 C atoms or phenyl;

and

F represents a monoazo or a polyazo dye radical.

2. Dyes according to claim 1, wherein

A, m, $R_1$ and F are as defined in claim 1;

and

M represents an alkali metal cation.

3. Dyes of formula (20) according to claim 1, (20)

$$D_1-N{=}N-B-N{=}N-\text{[naphthalene with OH, } NR_1\text{-triazine(A)(S-(CH}_2)_m\text{-SO}_3M\text{), MO}_3S, (SO_3M)_{p1}]$$

wherein

A, m, $R_1$ and M are as defined in claim 1;

and

B represents one of the following groups

[naphthalene-SO$_3$M] or [phenyl with $R_5$, $R_6$]

wherein $R_5$, $R_6$ independently represent hydrogen, alkyl or alkoxy each having from 1 to 4 C atoms, chloro, bromo, carboxy or sulpho;

$D_1$ represents phenyl or phenyl substituted by one or two substituents selected from the group consisting of alkyl, alkoxy, chloro, bromo, carboxy and sulpho, or naphthyl or naphthyl substituted by 1 or 2 sulpho groups;

and $p_1$ is 0 or 1.

4. Dyes of formula (21) according to claim 1, (21)

$$D_1-N{=}N-B-N{=}N-\text{[phenyl with } R_7, R_8, NR_1\text{-triazine(A)(S-(CH}_2)_m\text{-SO}_3M\text{)]}$$

wherein

A, m, $R_1$ and M are as defined in claim 1;

B represents one of the following groups

[naphthalene-SO$_3$M] or [phenyl with $R_5$, $R_6$]

wherein $R_5$, $R_6$ independently represent hydrogen, alkyl or alkoxy each having from 1 to 4 C atoms, chloro, bromo, carboxy or sulpho;

$D_1$ represents phenyl or phenyl substituted by one or two substituents selected from the group consisting of alkyl, alkoxy, chloro, bromo, carboxy and sulpho, or naphthyl or naphthyl substituted by 1 or 2 sulpho groups;

and

R_7, R_8 independently represent hydrogen, alkyl or alkoxy or acylamino with up to 3 C atoms.

5. Dyes of formula (22) according to claim 1,

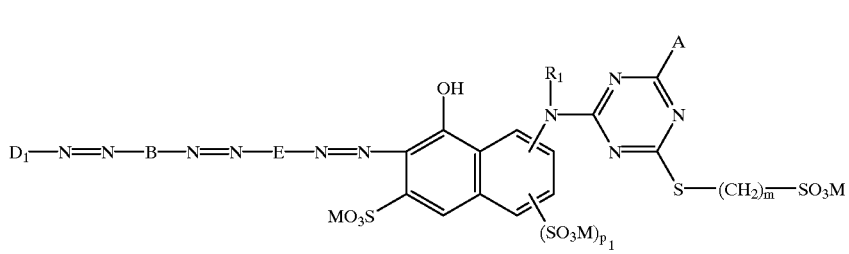
(22)

wherein

A, m, $R_1$ and M are as defined in claim 1;

B represents one of the following groups

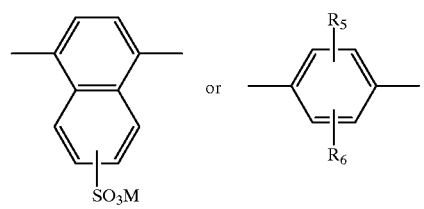

wherein $R_5$, $R_6$ independently represent hydrogen, alkyl or alkoxy each having from 1 to 4 C atoms, chloro, bromo, carboxy or sulpho;

$D_1$ represents phenyl or phenyl substituted by one or two substituents selected from the group consisting of alkyl, alkoxy chloro, bromo, carboxy and sulpho, or naphthyl or naphthyl substituted by 1 or 2 sulpho groups;

is 0 or 1;

and

E represents phenyl or phenyl substituted by one or two substituents selected from the group consisting of alkyl, alkoxy, chloro, bromo, carboxy and sulpho, or naphthyl or naphthyl substituted by one or two substituents selected from the group consisting of sulpho, hydroxy and amino.

6. Dyes of formula (23) according to claim 1,

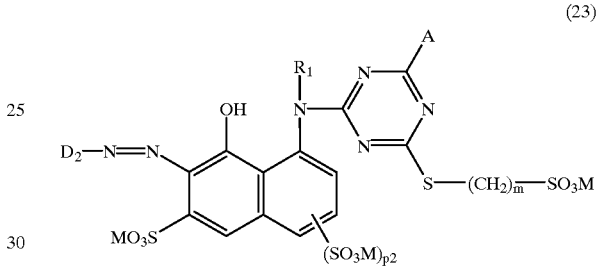
(23)

wherein

A, m, $R_1$ and M are as defined in claim 1;

$D_2$ represents phenyl or phenyl substituted by one or two substituents selected from the group consisting of alkyl, alkoxy, chloro, bromo, carboxy and sulpho, or naphthyl or naphthyl substituted by one or two sulpho groups;

and $p_2$ is 0 or 1.

7. Dyes of formula (24) according to claim 1,

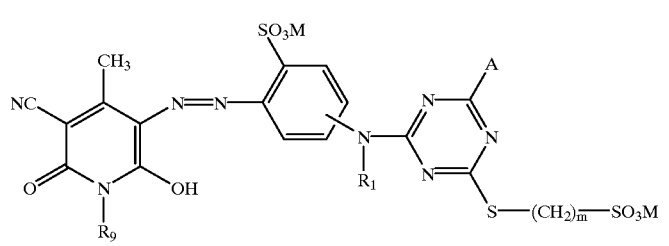
(24)

wherein

A, m, $R_1$ and M are as defined in claim 1;

and $R_9$ represents hydrogen, alkyl with 1 to 6 C atoms, substituted alkyl with 2 to 6 C atoms, where the substituents are selected from the group consisting of carboxy, hydroxy and sulpho, phenyl or substituted phenyl, where the substituents are selected from the group consisting of methyl, chloro, bromo and sulpho.

8. Dyes of formula (25) according to claim 1,

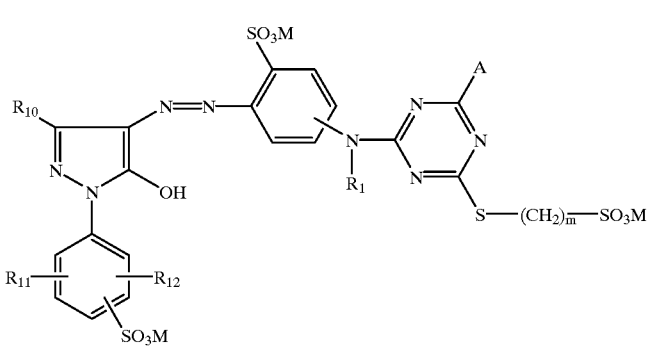
(25)

wherein

A, m, $R_1$ and M are as defined in claim 1;

$R_{10}$ represents $CH_3$, COOH or $NHCOCH_3$;

and $R_{11}$, $R_{12}$ independently represent hydrogen, chloro, bromo or methyl.

9. Dyes of formula (26) according to claim 1,

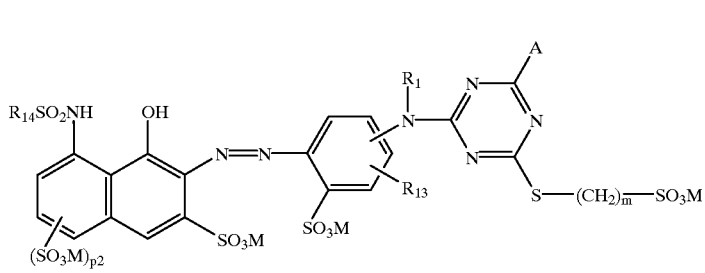
(26)

wherein

A, m, $R_1$ and M are as defined in claim 1;

$R_{13}$ represents hydrogen, alkyl or alkoxy each having up to 3 C atoms;

$R_{14}$ represents alkyl with 1 to 8 C atoms, phenyl or phenyl substituted by one or more substituents selected from the group consisting of chloro, bromo, alkyl and alkoxy each having from 1 to 4 C atoms;

and $p_2$ is 0 or 1.

10. Dyes of formula (27) according to claim 1,

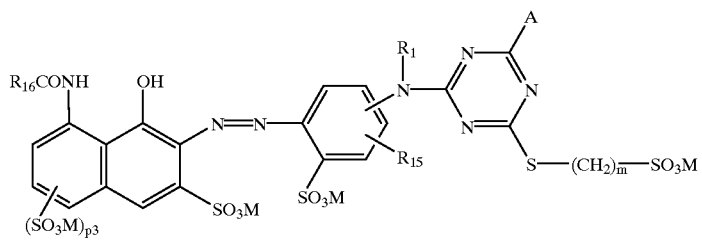
(27)

wherein

A, m, $R_1$ and M are as defined in claim 1;

$R_{15}$ represents hydrogen, alkyl or alkoxy each having up to 3 C atoms;

$R_{16}$ represents alkyl with 1 to 8 C atoms, substituted alkyl with 1 to 6 C atoms, where the substituents are selected from the group consisting of $COOCH_3$, $COOH$ and halogen, phenyl or phenyl substituted by one or more substituents selected from the group consisting of chloro, bromo, alkyl, alkoxy, alkylcarbonylamino and alkylsulphonyl each having from 1 to 4 C atoms, or pyridine;

and $p_3$ is 0 or 1.

$R_{20}$ represents hydrogen, alkyl with 1 to 6 C atoms, substituted alkyl with 2 to 6 C atoms, where the substituents are selected from the group consisting of CN, COOH, OH, $COOCH_3$, $COOCH_2CH_3$ and $COCH_3$, phenyl or substituted phenyl, where the substituents are selected from the group consisting of methyl, chloro and bromo.

13. Dyes of formula (30) according to claim 1,

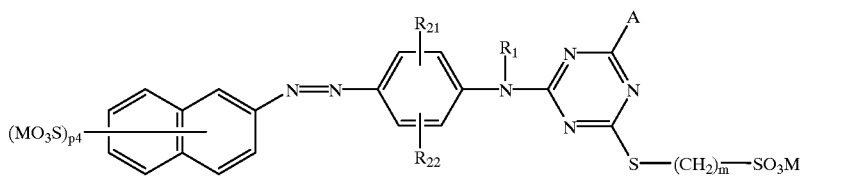

(30)

11. Dyes of formula (28) according to claim 1,

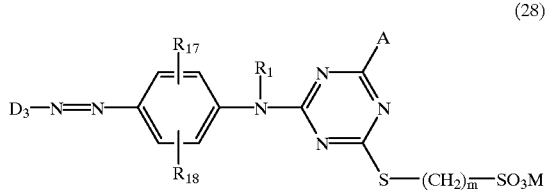

(28)

wherein

A, m, $R_1$ and M are as defined in claim 1;

$D_3$ represents phenyl or phenyl substituted by one or two substituents selected from the group consisting of sulpho, chloro, bromo, carboxy, alkyl and alkoxy;

and $R_{17}$, $R_{18}$ independently represent hydrogen, chloro, bromo, ureido, alkyl, alkoxy or acylamino each having up to 3 C atoms.

12. Dyes of formula (29) according to claim 1, wherein

A, m, $R_1$ and M are as defined in claim 1;

$R_{21}$, $R_{22}$ independently represent hydrogen, chloro, bromo, ureido, alkyl, alkoxy or acylamino each having up to 3 C atoms;

and $p_4$ is 1, 2 or 3 and the $SO_3M$ group is in positions 1 or 4 or 5 or 6 or 7 or 8, when $p_4$ is 1; or the $SO_3M$ groups are in positions 4 and 8 or 5 and 7 or 6 and 8 or 1 and 5, when $p_4$ is 2; or the $SO_3M$ groups are in positions 3 and 6 and 8 or 4 and 6 and 8, when $p_4$ is 3.

14. Dyes according to claim 1, wherein

M represents hydrogen, a metal cation, ammonium or substituted ammonium, wherein the substituents are selected from the group consisting of alkyl, alkoxyalkyl or hydroxyalkyl each having from 1 to 12 C atoms or phenyl; quanidinium or substituted quanidinium, where the substituent is selected from the group consisting of alkyl with 1 to 12 C atoms or phenyl;

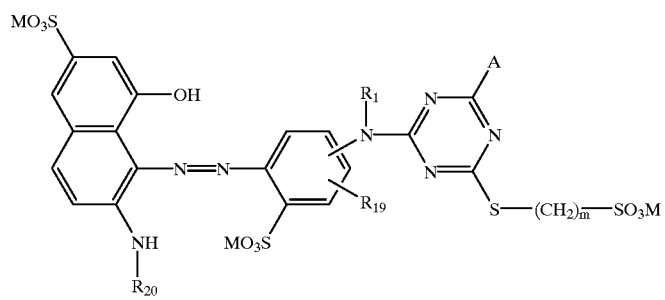

(29)

wherein

A, m, $R_1$ and M are as defined in claim 1;

and $R_{19}$ represents hydrogen, alkyl or alkoxy with up to 3 C atoms;

M is from 2 to 4;

$R_1$ represents hydrogen;

and

F represents a monoazo or polyazo dye radical.

15. Process for the preparation of azo dyes according to claim 1, wherein (i) a compound of formula (5)

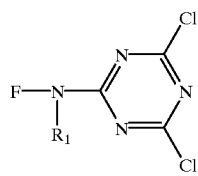

(5)

where $R_1$ and F are as defined in claim 1,
are reacted with a compound of formula (6)

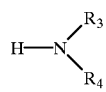

(6)

where $R_3$ and $R_4$ are as defined in claim 1,
under conditions where one of the chlorine atoms of the dichlorotriazine of formula (5) is replaced by the compound of formula (6);
or a compound of formula (7)

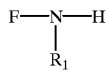

(7)

where $R_1$ and F are as defined in claim 1, is reacted with a compound of formula (8)

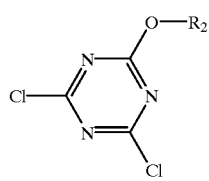

(8)

where $R_2$ is as defined in claim 1,
under conditions that one of the chlorine atoms of the dichlorotriazine of formula (8) is replaced by the compound of formula (7),
and
(ii) the disubstituted triazine is reacted with a compound of formula (9)

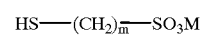

(9)

where m is as defined in claim 1,
under conditions that the third chlorine atom of the triazine ring is replaced by the compound of formula (9).

16. Process for dyeing cellulose containing material, paper, cotton, viscose, leather and wool by applying thereto an azo dye according to anyone of claims 1 to 14.

17. Liquid dye preparations comprising a dye or a mixture of dyes according to anyone of claims 1 to 14.

18. Inks for ink jet printing comprising a dye or a mixture of dyes according to anyone of claims 1 to 14.

\* \* \* \* \*

UNITED STATES PATENT AND TRADEMARK OFFICE
CERTIFIED OF CORRECTION

PATENT NO : 6,068,687

DATED : May 30, 2000

INVENTOR(S) : BAETTIG et al.

It is certified that error appears in the above-identified patent and that said Letters Patent are hereby corrected as shown below:

In the Claims at:

Claim 4, Col. 27 line 39 change "alkoxy chloro" to -- alkoxy, chloro --.

Claim 14, Col. 32 line 43 change "quanidinium or substituted quanidinium" to -- guanidinium or substituted guanidinium --.

Claim 14, Col. 32 line 62 change "M" to -- m --.

Signed and Sealed this

Twenty-second Day of May, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO. : 6,068,687
DATED : May 30, 2000
INVENTOR(S) : Baettig et al.

Page 1 of 1

It is certified that error appears in the above-identified patent and that said Letters Patent is hereby corrected as shown below:

Column 4,
Line 27, change "2to 6" to -- 2 to 6 --.

Column 20,
Line 57, change "20°C. to" to -- 20°C to --.
Line 65, change "60°C. to" to -- 60°C to --.

Column 22,
Line 1, change "60°C. to" to -- 60°C to --.
Line 33, change "50°C. under" to -- 50°C under --.
Line 35, change "20°C.," to -- 20°C, --.

Column 23,
Line 19, change "20°C.," to -- 20°C --.
Line 28, change "60°C. for" to -- 60°C for --.
Line 29, change "20°C. and" to -- 20°C and --.
Line 33, change "0°C. for" to -- 0°C for --.

Signed and Sealed this

Ninth Day of October, 2001

Attest:

*Nicholas P. Godici*

NICHOLAS P. GODICI
*Attesting Officer*  *Acting Director of the United States Patent and Trademark Office*